(12) United States Patent
Goldsmith et al.

(10) Patent No.: US 9,515,774 B2
(45) Date of Patent: Dec. 6, 2016

(54) ENERGY-EFFICIENT WIRELESS COMMUNICATIONS VIA FEEDBACK

(71) Applicant: The Board of Trustees of the Leland Stanford Junior University, Palo Alto, CA (US)

(72) Inventors: Andrea Goldsmith, Menlo Park, CA (US); Seyed Reza Mir Ghaderi, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 14/185,754

(22) Filed: Feb. 20, 2014

(65) Prior Publication Data

US 2014/0233395 A1     Aug. 21, 2014

Related U.S. Application Data (60) Provisional application No. 61/767,191, filed on Feb. 20, 2013.

(51) Int. Cl.
    *H04L 1/00*     (2006.01)
    *H04W 52/48*     (2009.01)
    *H04L 1/16*     (2006.01)

(52) U.S. Cl.
    CPC ............ *H04L 1/0034* (2013.01); *H04L 1/16* (2013.01); *H04W 52/48* (2013.01); *H04L 1/0003* (2013.01); *H04L 1/0009* (2013.01); *Y02B 60/50* (2013.01)

(58) Field of Classification Search
    CPC . H04W 52/16; H04W 52/325; H04W 52/48; H04L 1/00; H04L 1/0009; H04L 1/16

USPC ............... 370/254-350; 709/201-213
    See application file for complete search history.

(56) References Cited

U.S. PATENT DOCUMENTS

| | | | |
|---|---|---|---|
| 7,085,541 B2 * | 8/2006 | Redi et al. | 455/69 |
| 7,486,742 B2 * | 2/2009 | Santhoff et al. | 375/295 |
| 8,379,736 B2 * | 2/2013 | Santhoff et al. | 375/259 |
| 2012/0295654 A1 * | 11/2012 | Sridhara et al. | 455/517 |

OTHER PUBLICATIONS

Agarwal, M. et al. (Aug. 2012). "Adaptive Training for Correlated Fading Channels with Feedback," *IEEE Transactions on Information Theory* 58(8):5398-5417.

(Continued)

*Primary Examiner* — Ayaz Sheikh
*Assistant Examiner* — Debebe Asefa
(74) *Attorney, Agent, or Firm* — Mintz Levin Cohn Ferris Glovsky and Popeo, P.C.

(57) ABSTRACT

Methods and apparatus, including computer program products, are provided for energy efficient communication based on feedback. A method may include sending a first message carried by a first wireless radio channel at a first predetermined energy level; receiving, in response to the first message, a second message carried by a second wireless radio channel; comparing the first message to the second message; sending a termination message, when the comparing indicates the first message and the second message match; and sending a portion of the first message at a second predetermined energy level, when the comparing indicates the second message contains at least one error when compared to the first message.

14 Claims, 5 Drawing Sheets

(56) References Cited

OTHER PUBLICATIONS

Agrawal, M. et al. (Dec. 2012). "Using Channel Output Feedback to Increase Throughput in Hybrid-ARQ," *IEEE Transactions on Signal Processing* 60(12):6465-6480.

Blackwell, D. (1953). "Equivalent Comparisons of Experiments," *Ann Math Stat* 24:265-272.

Cui, S. et al. (Sep. 2005). "Energy-Constrained Modulation Optimization," *IEEE Transactions on Wireless Communications* 4(5):2349-2360.

Fettweis, G. et al. (Sep. 2008). "ICT Energy Consumption-Trends and Challenges," *presented at The 11th International Symposium on Wireless Personal Multimedia Communications*, Lapland, Finland, Sep. 2008, 4 pages.

Gallager, R.G. et al. (Jan. 2010). "Variations on a Theme by Schalkwijk and Kailath," *IEEE Transactions on Information Theory* 56(1):6-17.

Goldsmith, A. (2004). *Wireless Communications* Cambridge University Press, 427 pages.

Grover, P. et al. (Sep. 2011). "Towards a Communication-Theoretic Understanding of System-Level Power Consumption," *IEEE Journal on Selected Areas in Communications* 29(8):1744-1755.

Istratescu, V.I. (1981). *Fixed Point Theory An Introduction* D. Reidel Publishing Company, Holland.

Kim, Y-H. et al. (Jun. 2007). "The Gaussian Channel with Noisy Feedback," *presented at The Proceedings of the International Symposium on Information Theory (ISIT 2007)*, Nice, France, Jun. 24-29, 2007, 5 pages.

Kim, Y-H. et al. (Mar. 2011). "Error Exponents for the Gaussian Channel with Active Noisy Feedback," *IEEE Transactions on Information Theory* 57(3):1223-1236.

Kramer, A.J. (Jan. 1969). "Improving Communication Reliability by Use of an Intermittent Feedback Channel," *IEEE Transactions of Information Theory* IT-15(1):52-60.

Mahajan, A. et al. (Dec. 2012). "Information Structures in Optimal Decentralized Control," *presented at the 51st IEEE Conference on Decision and Control*, Maui, Hawaii, Dec. 10-13, 2012, 16 pages.

Massaad, Y. et al. (Oct. 2004). "Impact of Processing Energy on the Capacity of Wireless Channels," *presented at the International Symposium on Information Theory and its Applications, ISITA 2004*, Parma, Italy, Oct. 10-13, 2004, 6 pages.

Mirghaderi, R. et al. (Dec. 2013). "Achievable Error Exponents in the Gaussian Channel with Rate-Limited Feedback," *IEEE Transactions on Information Theory* 59(12):8144-8156.

Pinsker, M.S. et al. (1968). "The Probability of Error in Block Transmission in a Memoryless Gaussian Channel with Feedback," *Problemy Peredachi Informatsii* 4(4):3-19. (English Translation of Abstract only).

Polyanskiy, Y. et al. (Aug. 2011). Minimum Energy to Send k Bits Through the Gaussian Channel With and Without Feedback, *IEEE Transactions on Information Theory* 57(8):4880-4902.

Schalkwijk, J.P.M. et al. (Apr. 1966). "A Coding Scheme for Addictive Noise Channels with Feedback-Part I: No Bandwidth Constraint," *IEEE Transactions on information Theory* IT-12(2):172-182.

Shepp, L.A. et al. (Jul. 1969). "Binary Communication Over the Gaussian Channel Using Feedback with a Peak Energy Constraint," *IEEE Transactions on Information Theory* IT-15(4):476-478.

Stanojev, I. et al (Jan. 2009). "Energy Efficiency of Non-Collaborative and Collaborative Hybrid-ARQ Protocols," *IEEE Transactions on Wireless Communications* 8(1):326-335.

Xiang, Y. et al. (Jun. 2010). "On the AWGN Channel with Noisy Feedback and Peak Energy Constraint," *presented at IEEE International Symposium on Information Theory* Austin, texas, Jun. 13-18, 2010, pp. 256-259.

Zigangirov, K.S. (1970). "Upper Bounds for the Error Probability for Channels with Feedback," *Problemy Peredachi Informatsii* 6(2):159-163. (English Translation of Abstract only).

\* cited by examiner

ENERGY-EFFICIENT WIRELESS COMMUNICATIONS VIA FEEDBACK

CROSS REFERENCE TO RELATED APPLICATIONS

This application claims priority to U.S. Provisional Patent Application 61/767,191 filed Feb. 20, 2013, entitled "Energy-Efficient Wireless Communications via Feedback," the contents of which are hereby incorporated by reference in its entirety.

STATEMENT OF GOVERNMENT SPONSORED SUPPORT

This invention was made with government support under contract CCF-0939370 awarded by the National Science Foundation, and under contract N00014-09-1-0072P00006 awarded by the Office of Naval Research. The government has certain rights in the invention.

FIELD

The subject matter disclosed herein relates to wireless communications.

BACKGROUND

Data communications between mobile devices and between mobile and fixed devices is becoming more and more important to daily life. As the capability of these devices increases, the power consumed generally increases as well. As the prevalence of data producing and data consuming devices increases, the energy efficiency of these devices becomes more important. Moreover, energy efficiency is particularly important to battery powered devices.

SUMMARY

Methods and apparatus, including computer program products, are provided for energy efficient communication based on feedback. A method may include sending a first message carried by a first wireless radio channel at a first predetermined energy level; receiving, in response to the first message, a second message carried by a second wireless radio channel; comparing the first message to the second message; sending a termination message, when the comparing indicates the first message and the second message match; and sending a portion of the first message at a second predetermined energy level, when the comparing indicates the second message contains at least one error when compared to the first message.

In some variations, one or more of the features disclosed herein including the following features can optionally be included in any feasible combination. The portion of the first message may include the first message. The portion of the first message may include the at least one error. The second predetermined energy level may be determined based on changing one or more of a modulation, an information encoding, a transmit power level, and a data rate. The second predetermined energy level may have a higher energy value than the first predetermined energy level in order to at least satisfy a target error rate. The second message may be sent at a third predetermined energy level, and a fourth energy level may be a sum of the first predetermined energy level and the third predetermined energy level. The first predetermined energy level may be fixed at a constant energy value. The fourth predetermined energy level may be fixed at a constant energy value. The third predetermined energy level may be adjusted to reduce an error rate to at least satisfy a target error rate. The third predetermined energy level may be fixed at a constant energy value. The fourth predetermined energy level may be fixed at a constant energy value. The first predetermined energy level may be adjusted to reduce an error rate to at least satisfy a target error rate.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Like labels are used to refer to same or similar items in the drawings.

DETAILED DESCRIPTION

In some example embodiments, the subject disclosed herein relates to energy optimization to reduce the total energy consumption in communication systems including point-to-point communication links with feedback links. The energy cost of both a forward link and a feedback link may be taken into account. Based on the energy consumption of the forward link and the feedback link, as well as a total energy budget and a delay constraint, the error probability performance of the communication links may be adjusted.

In some example embodiments, the subject matter disclosed herein may use a multi-phase feedback scheme in which a transmission, if reported as decoded incorrectly, may be followed by a retransmission with additional energy. The gain provided by using the feedback link may be dependent on the energy consumption profile of the communication links and the total available energy. To illustrate, two different energy consumption situations may apply. In the first situation, a one shot decoding error probability in each direction, forward and feedback, may decrease exponentially with the consumed energy during the corresponding transmission. In the first situation, the use of feedback link can significantly increase the energy efficiency if the total available energy is large enough. This may not be the case for energy budget levels below a threshold value. In the second situation, the probability of decoding error as a function of consumed energy may follow a super-exponential decay. In the second situation, the feedback link may not increase energy efficiency for energy levels above a certain threshold.

For a point-to-point communication system, the presence of a feedback link may lead to relatively large improvements in reliability and the efficient use of the transmitter's resources. In particular, feedback may be shown to increase the transmitter's energy efficiency. The benefits of feedback may, however, come at the cost of extra energy consumption on the feedback link which may increase as more energy is used by the feedback link. Therefore, when considering the total energy consumption, the energy consumed in both the forward link and the feedback may be taken into account. The impact of feedback can be determined when the total energy budget is limited, the delay is constrained, the feedback link is lossy, the feedback energy consumption is counted toward the total energy, and/or in other instances. Increasing the energy in the feedback link can lead to less encoding/decoding complexity on the forward link, which can decrease the energy consumption in the forward link and the total energy consumption. Increasing the energy in the feedback link may also achieve a predetermined error probability performance with less usage (in either time or frequency) of the forward link transmission channel, which may reduce the energy consumed in the transmitter.

In some example embodiments, the subject matter disclosed herein, may be based on a multi-phase (e.g., iterative) feedback scheme in which after each transmission, the sender listens to the feedback report and retransmits the message with boosted (e.g., additional) energy if the sender determines that the previous transmission was decoded incorrectly. A maximum achievable reliability (e.g., with minimum error probability) may be characterized by jointly optimizing the energy allocated to the forward link and feedback link in a dynamic fashion. The energy allocated to the forward link and feedback link may be determined based on for example a choice of modulation for each link, the choice of encoding/decoding for each link, and other factors as well.

Figure 1:
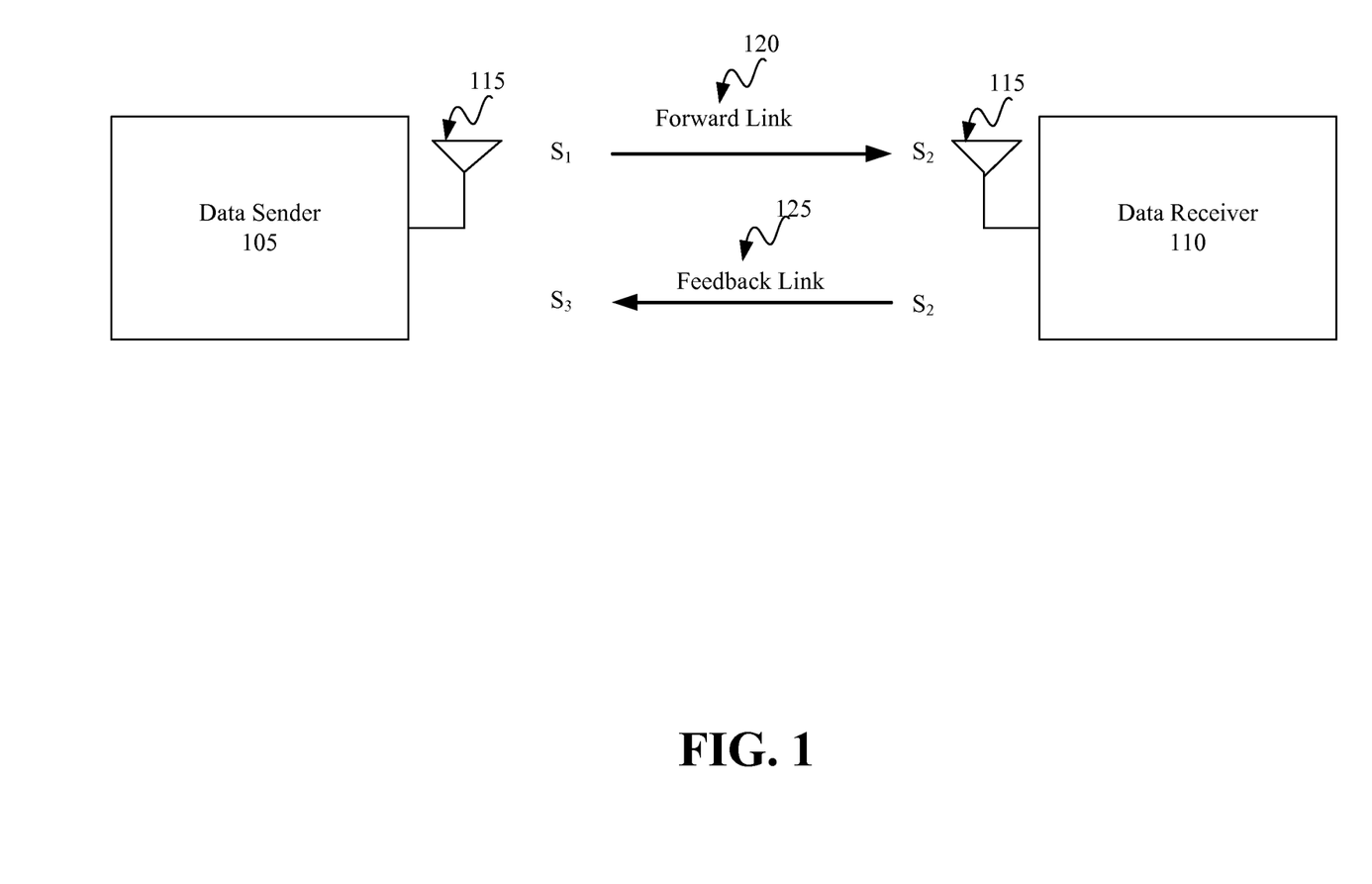
FIG. 1 depicts a system block diagram, in accordance with some example embodiments.

FIG. 1 depicts a system block diagram, in accordance with some example embodiments. Data sender 105 may transmit a message over the air via a forward link 120 to a data receiver 110. Data receiver 110 may determine to the best of its ability the transmitted message and transmit the received message via feedback link 125 to data sender 105. Data sender 105 may compare the received transmission to the original message to determine if any errors occurred. When no errors occurred, the data sender 105 may choose to not retransmit, but when errors occurred, data sender 105 may choose to retransmit a message.

Data sender 105 may be any type of wireless device and may also include receiver capabilities. For example, data sender 105 may be implemented as an radio frequency (RF) transceiver, a user equipment of a cellular network, a handheld wireless device, a mobile wireless device, a land based wireless device, a space based wireless device, and/or any other type of radio/transceiver. Data sender 105 may transmit a message carried by an RF carrier via antenna 115 and forward link 120. Data sender 105 may also transmit a header and/or preamble. The message may include information, such as one or more data bits and/or the like.

Data receiver 110 may receive the message sent by data sender 105 via forward link 120 and antenna 115, and data receiver 110 may also include transmit capabilities. Data receiver 110 may be implemented as an radio frequency (RF) transceiver, a user equipment of a cellular network, a handheld wireless device, a mobile wireless device, a land based wireless device, a space based wireless device, and/or any other type of radio/transceiver.

Forward link 120 may be operated at a predetermined frequency or frequencies, and/or forward link 120 may have time slots at the predetermined frequency/frequencies. Data sender 105 may send a message $S_1$ to data receiver 110. Data receiver 110 may receive message $S_1$ in the presence of noise and interference, and data receiver's estimate of $S_1$ is message $S_2$, which may have errors due to the noise and interference. Data receiver 110 may transmit back to data sender 105 the estimate $S_2$ via feedback link 125. Feedback link 125 may be configured in the same or similar manner as link 120, although link 125 may be different as well. In any case, data sender 105 may receive message $S_2$ given noise, interference, and other factors. As a result of the noise, interference, and other factors, the estimate that data sender 105 may be determined by data sender 105 as message $S_3$, which may have errors due to the noise, interference, and the like.

Data sender 105 may compare received message $S_3$ and transmit message $S_1$ (for example, data sender 105 may compare its estimate $S_3$ of the $S_2$ message (which in turn was data receiver 110's estimate of originally transmitted message $S_1$ from data sender 105). If the $S_3$ message has no errors when compared to the original message $S_1$, then no retransmission by the data sender 105 may be performed. However, if the $S_3$ message contains errors when compared to the original message $S_1$, then data sender 105 may retransmit message $S_1$. Data sender 105 may choose a higher energy level to retransmit message $S_1$ to data receiver 110. A higher energy level retransmission may reduce the probability of error at data receiver 110 and thus be more likely to result in successful communication of the message $S_1$. In some embodiments, additional error correction encoding/decoding may be used at data sender 105 and data receiver 110 which may allow a number of errors in message $S_3$ to be corrected when compared to message $S_1$ without retransmission. When errors are still present after the additional encoding/decoding or if no additional encoding/decoding is used and errors are present, retransmission of message $S_1$ may be performed. The process of retransmission followed by selecting a new energy level may repeat until successful communication of the message $S_1$ is achieved.

In some example embodiments, upon the detection of an error, if additional energy and/or time (according to a delay constraint) are available, the transmitter may try to correct the $S_2$ by a retransmission. In some example embodiments, retransmissions can be combined (i.e. the transmitter does not retransmit the whole message $S_1$ but a subset of the message). In some example embodiments, one or more of coding, modulation, power level, diversity level, data rate, and so forth, may be changed in the retransmission. In some example embodiments, retransmissions are repeated at increasing energy levels until message $S_1$ is correctly decoded at data receiver 110. In some example embodiments, a small number of errors may be tolerated (e.g. lossy video, voice, etc.), and/or errors may be corrected at a higher layer in the network stack or by an outer code. For example, the energy level of successive retransmissions may increase to achieve a predetermined probability of error. In some example embodiments, retransmission(s) of partial messages may be combined with a previous received message (i.e. message combining).

Figure 2:
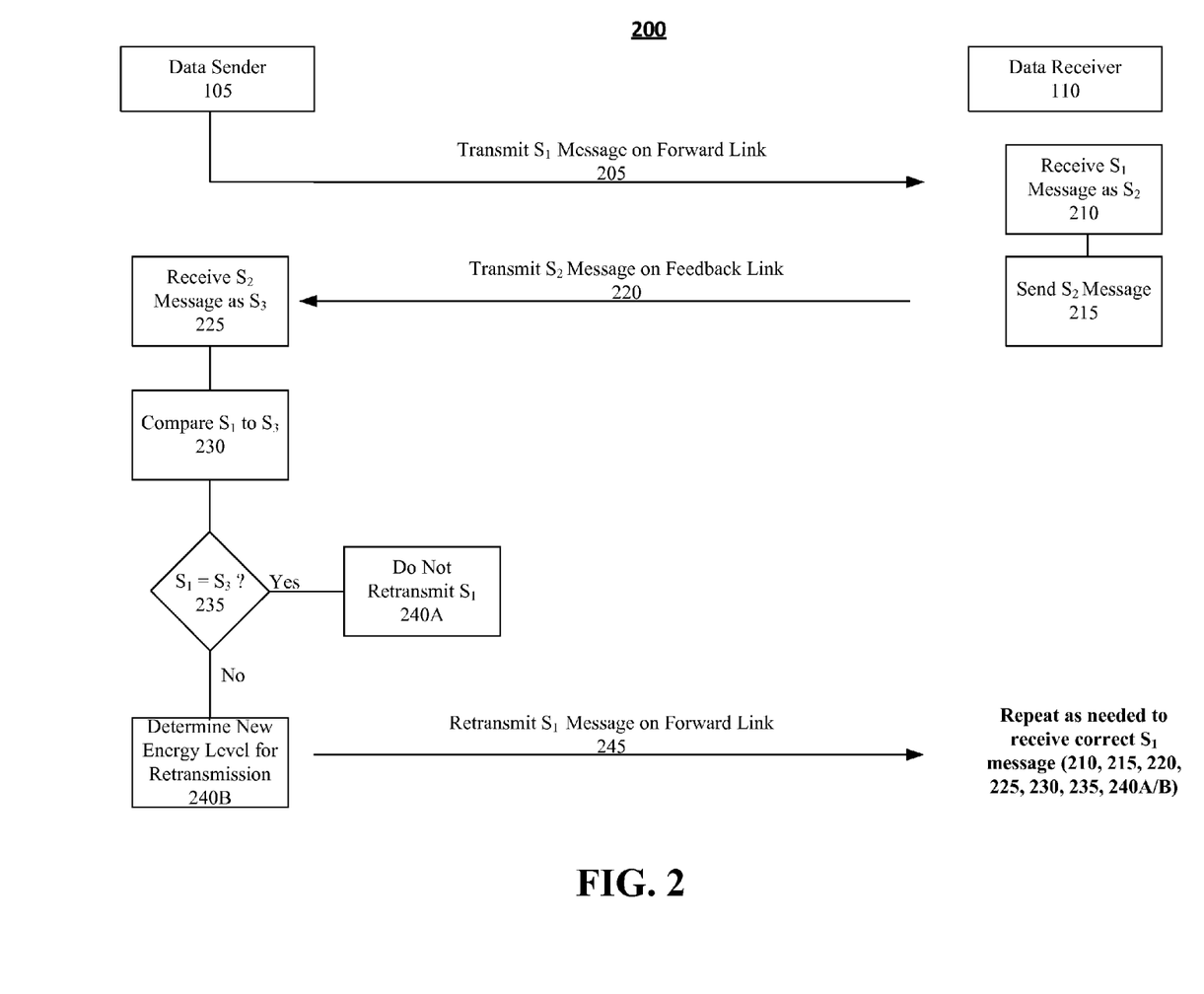
FIG. 2 depicts a signaling diagram, in accordance with some example embodiments.

FIG. 2 depicts a signaling diagram 200, in accordance with some example embodiments. The description of FIG. 2 also refers to FIG. 1.

The objective of data sender 105 is to send a message to data receiver 110. Data receiver 110 may send its estimate of the message sent by data sender 105 back to data sender 105. Data sender 105 may then compare the original message that data sender 105 sent to data sender 105's estimate of the message transmitted back from data receiver 110. When the message received at data receiver 110 does not match the contents of the original message, the data sender 105 may increase the energy to improve the likelihood that the message will be received correctly at data receiver 110. The process may repeat until data receiver 110 receives the message correctly.

At 205, data sender 105 may transmit message $S_1$ over forward link 120 to data receiver 110, in accordance with some example embodiments. Forward link 120 may be a noisy wireless channel, for example. Data receiver 110 may receive a message and determine at 210 an estimate $S_2$ representative of transmit message $S_1$ subject to noise, interference, and the like (for example, non-idealities in the transmitter and receiver components).

At 215, data receiver 110 may send back to data sender 105 the estimate message $S_2$ over feedback link 125. Feedback link 125 may be a noisy wireless channel. Data sender 105 may receive the message transmitted by data receiver 110 and determine at 225 an estimate $S_3$ representative of transmit message $S_2$ subject to noise, interference, and the like (for example, non-idealities in the transmitter and receiver components). Data sender 105 may compare the original message $S_1$ to the estimate $S_3$ at 235.

At 240A, when $S_3$ contains no errors (or with correctable errors as described above) when compared to original message $S_1$ (data sender 105's estimate of $S_2$), then no retransmission by data sender 105 may be needed.

At 240B, when data sender 105's estimate of $S_2$ has errors when compared to original message $S_1$, then data sender 105 may determine a next energy level with which to retransmit message $S_1$. A higher energy level may be used to improve the message reception at data receiver 110. At 245, data sender 105 may retransmit message $S_1$ to data receiver 110 using the determined next energy level. For example, data sender 105 may resend message $S_1$ using a higher transmit power to increase the probability of successful reception by data receiver 110. In some embodiments, data sender 105 may cause data receiver 110 to increase the energy level at which message $S_2$ is sent over feedback link 120 from data receiver 110 to data sender 105.

Moreover, the process 200 may be repeated until data receiver 110 receives message $S_1$ without error.

Figure 3:
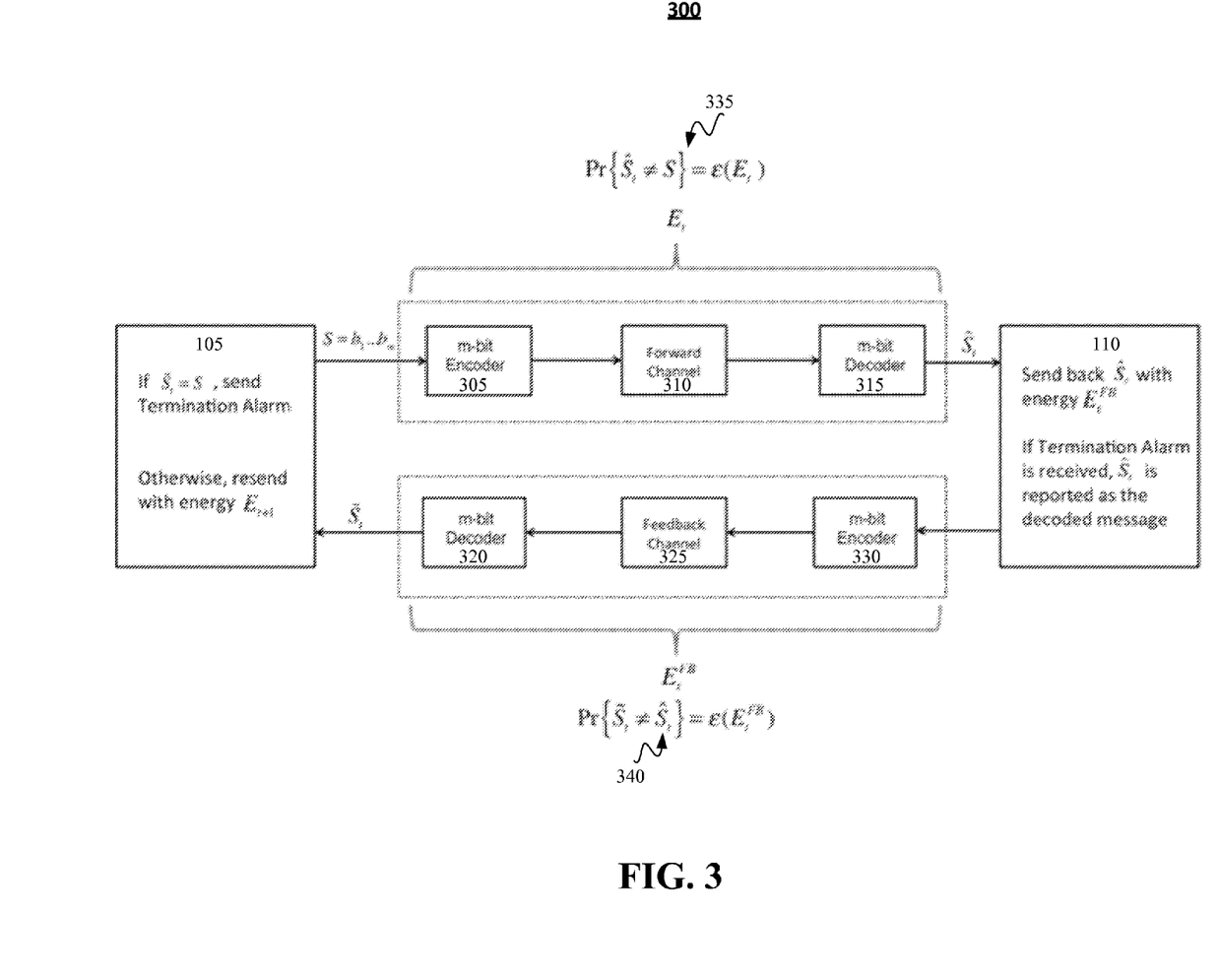
FIG. 3 depicts a system block diagram, in accordance with some example embodiments.

FIG. 3 depicts a system block diagram, in accordance with some example embodiments. FIG. 3 also refers to FIGS. 1 and 2. FIG. 3 depicts data sender 105 sending a series of bits to m-bit encoder 305 followed by transmission over wireless forward channel 310. Forward channel 310 includes transmission of a message over a wireless radio channel and reception of the transmitted message. The received message may then be decoded at m-bit decoder 315 and passed as an estimate of $S_1$ to data receiver 110 ($\hat{S}_t$ in FIG. 3 or estimate $S_2$ in FIG. 2). Data receiver 110 may send the received estimate back to data sender 105 by passing the estimate ($\hat{S}_t$ in FIG. 3) through m-bit encoder 330, feedback channel 325, and m-bit decoder 320. Feedback channel 325 may include transmission of message $\hat{S}_t$ over the feedback wireless radio channel and reception at data sender 105 of the transmitted message. The received message may then be decoded at m-bit decoder 320 and passed as estimate $S_3$ to data receiver 110 ($\tilde{S}_t$ in FIG. 3 or estimate $S_3$ in FIG. 2). Data sender 105 may determine if the received estimate $S_3$ matches original message $S_1$. When $S_1$ matches $S_3$, an end of transmission alarm (EOTA) may be sent from data sender 105 to data receiver 110 indicating that the message contents sent by data sender 105 and received by data receiver 110 are correct. When $S_1$ does not match $S_3$, data sender 105 may retransmit the message to data receiver 110 at a higher energy level.

Consistent with the subject matter in FIGS. 1, 2, and 3, further details of the present subject matter are described below. In particular, an example way for choosing an energy level for retransmission of a message from data sender 105 to data receiver 110 is further described.

The following example illustrates using a feedback link from the data sender 105 to data receiver 110. In this example, one bit of data (S∈{0, 1}) may be sent using a BPSK (binary phase shift keying) modulator on both the forward and feedback links. Both links may operate in the presence of additive white Gaussian noise (AWGN) with unit noise variance. In this example, there may be a delay constraint such that the forward channel may be used at most two times and the feedback channel may be used at most once (after the first forward transmission). The transmit energy assigned to the first and second forward transmissions may be denoted by $E_1$ and $E_2$ and the feedback transmit energy by $E^{FB}$. The expected total energy constraint may be expressed:

$$\mathbb{E}[E_1+E_2+E^{FB}]\leq E_{tot}, \quad (1)$$

In this example, sender 105 and receiver 110 may perform the following. Given γ∈(0,1), 1) Sender transmits its data bit S using the BPSK modulator with amplitude $\sqrt{E_1}$ 2) Receiver sends back the decoded bit $\hat{S}1$ using the BPSK modulator with amplitude $\sqrt{E^{FB}}$ 3) Sender compares the decoded bit from the feedback link ($\tilde{S}_1$) with S. If ($\tilde{S}_1$=S), it stays silent during the second time slot (i.e. $E_2$=0), otherwise the sender retransmits with amplitude $$\sqrt{E_2} = \sqrt{E_{2,c}} = \sqrt{\frac{E_{tot} - E_1 - E^{FB}}{Pr\{\tilde{S}_1 \neq S\}}}$$

4) If the received signal in the second forward transmission has an amplitude less than $\gamma\sqrt{E_{2,c}}$, the receiver declares $\hat{S}_1$ as the final decoded bit ($S_{final}=\hat{S}_1$). Otherwise, the decoded bit in the second transmission is declared as the final decoded bit ($S_{final}=\hat{S}_2$).

In this example, the optimal error probability for communication without feedback is $Q(\sqrt{E_{tot}})$, where $Q(\cdot)$ is the tail function of the standard normal distribution. Also, the error probability for the interactive scheme is given as, $$Pr\{\hat{S}_1 \neq S, \tilde{S}_1 = \hat{S}_1, S_{final} = \hat{S}_1\} + Pr\{\hat{S}_1 = S, \tilde{S}_1 = \hat{S}_1, S_{final} \neq \hat{S}_1\} + \quad (2)$$
$$Pr\{\hat{S}_1 \neq S, \tilde{S}_1 \neq \hat{S}_1, S_{final} = \hat{S}_1\} + Pr\{\hat{S}_1 = S, \tilde{S}_1 \neq \hat{S}_1, S_{final} \neq \hat{S}_1\} =$$

-continued $$(1 - Q(\sqrt{E^{FB}}))Q(\sqrt{E_1})Q((1-\gamma)\sqrt{E_{2,c}}) +$$

$$(1 - Q(\sqrt{E^{FB}}))(1 - Q(\sqrt{E_1}))Q(\gamma\sqrt{E_{2,c}}) +$$

$$Q(\sqrt{E^{FB}})Q(\sqrt{E_1})(1 - Q((1-\gamma)\sqrt{E_{2,c}})) +$$

$$Q(\sqrt{E^{FB}})(1 - Q(\sqrt{E_1}))Q((2-\gamma)\sqrt{E_{2,c}}).$$

Figure 4A:
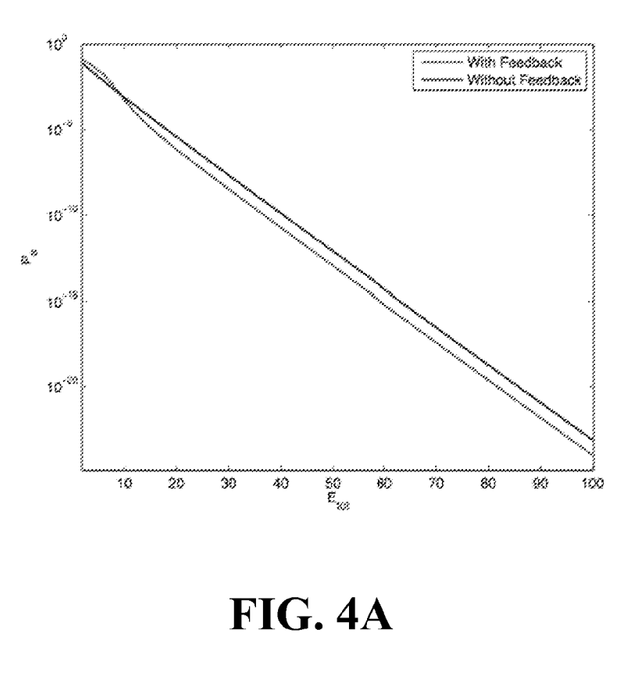
FIG. 4A depicts a plot of error probabilities with and without feedback, in accordance with some example embodiments.

Optimizing the above term with respect to $E_1$, $E^{FB}$ and $\gamma$, determines the minimum error probability achievable using the interactive scheme. In this example, the error probabilities with and without feedback are shown in FIG. 4A. FIG. 4A indicates that the interactive scheme outperforms the scheme without feedback by a positive margin when the available total energy is large enough. BPSK was used in this example but more complicated scenarios where with higher order constellations on the forward and/or the feedback channels may also be used. Moreover, the constellation of the forward link may be different than the constellation on the feedback link.

Consistent with some example embodiments, a point-to-point link may include an iterative communication framework. The point-to-point link may include transmission of a data packet S containing m bits, $b_1, \ldots, b_m$ of data over a lossy channel under a delay constraint. A fixed channel block encoder/decoder may adapt to the available energy level as further detailed below.

At the $t^{th}$ step (the $t^{th}$ retansmission), the channel encoder (for example, channel encoder 305 in FIG. 3) may take the forward energy budget level $E_t$ determined by a communication policy, $\pi$, and encode the packet S so that the total consumed energy (transmit+encoding/decoding) in the $t^{th}$ forward transmission is equal to $E_t$. At the end of the $t^{th}$ forward transmission, the receiver may decode the received signal into data packet $\hat{S}_t$. $\hat{S}_t$ may then be encoded using the encoder available on the feedback link such that the total consumed energy on the feedback link does not exceed $E_t^{FB}$ determined by $\pi$. The decoded feedback packet at the end of the $t^{th}$ feedback transmission is denoted by $\tilde{S}_t$. Based on whether $\tilde{S}_t$ matches the originally transmitted packet S, the sender may decide to further retransmit the packet or declare the end of the transmission sequence by sending the End of Transmission Alarm (EOTA). In some example embodiments, upon receiving a new retransmission of the packet, the decoder may discard all the previous transmissions (no combination with the previous transmissions of the packet). Using this decoder, the receiver declares its last decoded packet as the final decoded packet upon receiving the EOTA (at time $t_{EOTA}$):

$$S_{final} = \hat{S}_{t_{EOTA}-1}. \quad (3)$$

In some example embodiments, m is large enough that the extra energy needed for EOTA and the corresponding packet header to distinguish between the data packet and the EOTA packet is small enough to be negligible. For any policy, $E_t$ may be expressed as, $$E_t = E_t^{FB} = 0, t \geq t_{EOTA}. \quad (4)$$

In some example embodiments, a delay constraint may require $$t_{EOTA} \leq T, \quad (5)$$

where T>1 is the maximum delay.

In view of the foregoing, a policy may be identified by the time to send the $t_{EOTA}$, (may be a function of feedback messages), the allocation of the forward energy budgets, $\{E_t\}_{t=1}^{t_{EOTA}-1}$ (may be a function of the feedback signals), and the feedback energy budgets $\{E_t^{FB}\}_{t=1}^{t_{EOTA}-1}$. In some example embodiments, the policy may control the quality of channel encoding/decoding through the energy level it allocates to the forward and feedback links.

In some example embodiments, the encoder/decoder error performance as a function of energy consumption may be identical or nearly identical in both forward and feedback directions. The encoder/decoder error performance may be characterized by an error function $\epsilon(\bullet)$ detailed below. The input argument of $\epsilon(\bullet)$ is the total consumed energy in either the forward or the feedback direction. The probability of error in decoding the m-bit packet sent in either direction in the $t^{th}$ step is given by the following:

$$Pr(\hat{S}_t \neq S) = \epsilon(E_t),$$

$$Pr(\tilde{S}_t \neq \hat{S}_t) = \epsilon(E_t^{FB}). \quad (6)$$

In some example embodiments, the error performance may be symmetric where, for all t and any two distinct bit sequences $(b_1, \ldots, b_m)$ and $(b'_1, \ldots, b'_m)$, the symmetric error performance may be represented as, $$Pr(\hat{S}_t = (b'_1, \ldots, b'_m) \mid S = (b_1, \ldots, b_m)) = \frac{\epsilon(E_t)}{M-1}, \quad (7)$$

$$Pr(\tilde{S}_t = (b'_1, \ldots, b'_m) \mid \hat{S}_t = (b_1, \ldots, b_m)) = \frac{\epsilon(E_t^{FB})}{M-1},$$

where $M=2^m$ is the number of possible messages. While the specific shape of the error function may depend on the channel coding scheme and the circuit design, in some example embodiments $\epsilon(x)$ (for $x \geq 0$) may have the following features:

| | | |
|---|---|---|
| Monotonicity: | $\epsilon'(x) < 0$ | (8) |
| Convexity: | $\epsilon''(x) > 0$ | |
| Boundedness: | $0 \leq \epsilon(x) \leq 1$ | |
| Initial Value (Blind Guessing): | $\epsilon(0) = 1 - \frac{1}{M}$ | |

In some example embodiments, successive energy values for retransmission from data sender 105 to data receiver 110 may be chosen to minimize the end-to-end probability of error, $$Pr(S_{final} \neq S) \quad (9)$$

subject to the delay constraint of Equation 5 and a total energy constraint of Equation 1.

In some example embodiments, a feedback link may be available but the total energy consumed on the forward and feedback link may be constrained as follows:

$$\mathbb{E}\left[\sum_{t=1}^{T} E_t + E_t^{FB}\right] \leq E_{tot}. \quad (10)$$

The foregoing energy constraints may be stated in terms of expected energy consumption. The expectation may be with respect to the randomness in the policy which in turn is due to the randomness in its set of inputs. The original message S and the feedback messages can be different due to the channel conditions in the forward or feedback directions.

The error performance when a feedback link is used is further detailed below, in accordance with some example embodiments. In the presence of a feedback link, the receiver may send back its decoded message, such as message $S_2$, to facilitate the transmitter determining if any errors occurred and retransmit when needed. The benefit of such an interactive communication may come at the cost of the extra energy consumed in the feedback link including any subsequent retransmissions. Under a total energy constraint, an objective may be to find an optimal allocation of energy to the forward and feedback transmissions at each time in order to minimize the overall probability of error.

The optimal overall probability of error given the total energy $E_{tot}$ and maximum delay T may be expressed as $P_e^{FB}(E_{tot}, T)$.

When $E_{tot} \geq 0$ and $T \geq 2$, the probability of error may be expressed as, $$P_e^{FB}(E_{tot}, T) = \min \left\{ \epsilon(E_{tot}),  \min_{\sigma \in (a, \frac{1}{2})} \left[ \epsilon_1(\sigma E_{tot}) + \epsilon_2(\sigma E_{tot}) P_e^{FB}\left( \frac{E_{tot}(1 - 2\sigma)}{\epsilon_2(\sigma E_{tot})}, T - 1 \right) \right] \right\} \quad (11)$$

where $$\epsilon_1(x) = \frac{\epsilon(x)^2}{M - 1}, \quad (12)$$

$$\epsilon_2(x) = 2\epsilon(x) - \frac{M}{M - 1}\epsilon(x)^2,$$

and $$P_e^{FB}(x, 2) = e(x).$$

Equation 11 is a recursive equation that can be used to compute the optimal energy allocation to a forward channel, such as forward link 120, and a feedback channel, such as feedback link 125, at different times. Given a target probability of error, a total energy constraint and a maximum delay restriction (determined by T), the optimal transmit energy at the forward link and feedback link may be determined iteratively. The determination of optimal transmit energies may include various energy consumption elements of the system (e.g. energy in the circuits), various modulation and coding schemes that may be applied, differing energies in the forward and feedback links, differing costs in the forward and feedback links, and the effects of various fading environments.

Equation 11 may be further explained as follows. Since there is little or no possibility for any retransmissions when T=2, the optimal policy may allocate all the energy in its single forward transmission before EOTA (e.g. $E_1 = E_{tot}$) and therefore $P_e^{FB}(E_{tot}, 2) = \epsilon(E_{tot})$. For T>2, $\theta$ may denote the total energy allocated to the first forward and first feedback transmissions (i.e. $\theta = E_1 + E_1^{FB}$). At the end of the first forward and feedback transmissions, the sender may face two possible situations. Either the decoded feedback message matches the original message (i.e. $\tilde{S}_1 = S$), which may happen with probability $$Pr\{\tilde{S}_1 = S\} = Pr\{\tilde{S}_1 = S = \hat{S}_1\} + Pr\{\tilde{S}_1 = S \neq \hat{S}_1\} = \quad (13)$$

$$(1 - \epsilon(E_1))(1 - \epsilon(E_1^{FB})) + \frac{\epsilon(E_1)\epsilon(E_1^{FB})}{M - 1},$$

or the decoded feedback message is different from the original one (i.e. $S1 \neq S$), which may happen with probability $$Pr\{\tilde{S}_1 \neq S\} = 1 - Pr\{\tilde{S}_1 = S\} = \quad (14)$$

$$\epsilon(E_1)\left(1 - \frac{\epsilon(\theta - E_1)}{M - 1}\right) + (1 - \epsilon(E_1))\epsilon(\theta - E_1) = f_\theta(E_1)$$

In some example embodiments, the decoder may have a limited memory and the forward link and feedback link error rates may be symmetric. In these and other embodiments, in response to an error at the data receiver that is determined at the data sender 105, the policy may cause a response including:

Option 1) Send EOTA ($t_{EOTA} = 2$) if $\overline{S}_1 = S$ and retransmit if $\overline{S}_1 \neq S$; and/or Option 2) Send EOTA in either case Regarding option 1, two types of errors may correspond to this option. The first type may be the misdetection error which corresponds to the event that $\tilde{S}_1 = S \neq \hat{S}_1$, and has probability $$g_\theta(E_1) = \frac{\epsilon(E_1)\epsilon(\theta - E_1)}{M - 1}. \quad (15)$$

The second type of error may correspond to a retransmission error when $\tilde{S}_1 \neq S$. Since the policy does not use any further energy when $\tilde{S}_1 = S$, the available retransmission energy is $$\frac{E_{tot} - E_1 - E_1^{FB}}{Pr\{\tilde{S}_1 \neq S\}} = \frac{E_{tot} - \theta}{f_\theta(E_1)}. \quad (16)$$

The minimum overall probability of error conditional on the retransmission at t=2 given the maximum delay T may be equal to the minimum overall error probability when the maximum delay is T−1. Therefore, the contribution of the second type of error under option 1 is $$f_\theta(E_1) P_e^{FB}\left( \frac{E - \theta}{f_\theta(E_1)}, T - 1 \right). \quad (17)$$

The overall error probability is the sum of the probabilities of the two types of error:

$$g_\theta(E_1) + f_\theta(E_1) P_e^{FB}\left( \frac{E_{tot} - \theta}{f_\theta(E_1)}, T - 1 \right). \quad (18)$$

When the error function $\epsilon(\cdot)$ has positivity, monotonicity, and convexity and given $\theta$, $$\mathrm{argmin}_{x \in (0, \theta)} g_\theta(x) = \mathrm{argmin}_{x \in (0, \theta)} f_\theta(x) = \frac{\theta}{2}. \quad (19)$$

Since the overall error probability in EQN. 18 is increasing in both $g_\theta(E_1)$ and $f_\theta(E_1)$, the optimal value of $E_1$ given $\theta$ is $\theta/2$. Defining $$\sigma = \frac{\theta/2}{E_{tot}}$$

and the functions $\epsilon_1(\cdot)$ and $\epsilon_2(\cdot)$ as in equations $$\epsilon_1(\sigma E_{tot}) + \epsilon_2(\sigma E_{tot}) P_c^{FB}\left(\frac{E_{tot}(1-2\sigma)}{\epsilon_2(\sigma E_{tot})}, T-1\right). \quad (20)$$

In order for the policy to be optimal, the parameter $\sigma$ may be chosen to minimize the quantity in Equation 20.

Regarding option 2, the receiver may choose $\hat{S}_1$ as its final decoded message in either case, and therefore the overall error probability may be expressed as $\Pr\{\hat{S}_1 \neq S\} = \epsilon(E_1)$. An optimal policy should set $E_1 = 0 = E_{tot}$, if option 2 is selected. This may be the same as having no feedback. Choosing the best option among options 1 and 2 may lead to the result stated in the Equation 11.

As mentioned above, the two terms inside Equation 11 may correspond to two different approaches: 1) not using feedback and using the energy in one forward transmission 2) using feedback and applying an iterative scheme. The optimal policy may be considered as the solution to the recursive Equation 11 obtained by recursive calculations (e.g. dynamic programming).

Under feedback communication with end-to-end energy constraints, the optimal policy satisfies the following two properties For any $t \geq 1$, if $E_t^{FB} = 0$, then for all $t' > t$, $E_{t'} = E_{t'}^{FB} = 0$, (21)

For any $t \geq 1$, if $E_t^{FB} > 0$, then $E_t^{FB} = E_t$. (22)

The above properties may be considered a consequence of the convexity of the error function.

With no delay constraint ($T \to \infty$), Equation 11 may lead to $$P_e^{FB}(E_{tot}) = \quad (23)$$

$$\min\left\{\epsilon(E_{tot}), \min\left[\epsilon_1(\sigma E_{tot}) + \epsilon_2(\sigma E_{tot}) P_e^{FB}\left(\frac{E_{tot}(1-2\sigma)}{\epsilon_2(\sigma E_{tot})}\right)\right]\right\}.$$

The right hand side of Equation 23 may be considered as a mapping $\Phi^{FB}(\cdot)$ applied to the function $P_e^{FB}$. Then by using the contraction mapping theorem, one can start from an arbitrary error function (for e.g. $\epsilon(\cdot)$) and approach the solution to the above equation by iteratively $\Phi^{FB}(\cdot)$ iteratively.

In some example embodiments, where the error decay is exponential, the energy consumption is dominated by the transmit energy. Given an M-ary coherent modulation technique and an AWGN channel with unit variance, the probability of error $P_e$ in terms of symbol energy $E$ may be expressed as, $$P_e \approx \beta_M Q(\sqrt{\alpha_M E}), \quad (24)$$

where $\alpha_M$ and $\beta_M$ are constants that depend on the modulation type and M (the order of the modulation). The approximation $$Q(x) \approx \frac{1}{2} e^{-\frac{x^2}{2}}.$$

may be used to obtain the following approximation for the error function:

$$\epsilon(E) = \beta e^{-\alpha E}. \quad (25)$$

The initial condition stated in Equation 8 implies that $$\beta = \frac{M-1}{M}.$$

Given the exponential error function, one can compute the overall probability of error under different feedback scenarios using $$\epsilon_1(x) = \frac{\beta e^{-2\alpha x}}{M} \quad (26)$$

$$\epsilon_2(x) = 2\beta e^{-\alpha x} - \beta e^{-2\alpha x}.$$

Figure 4B:
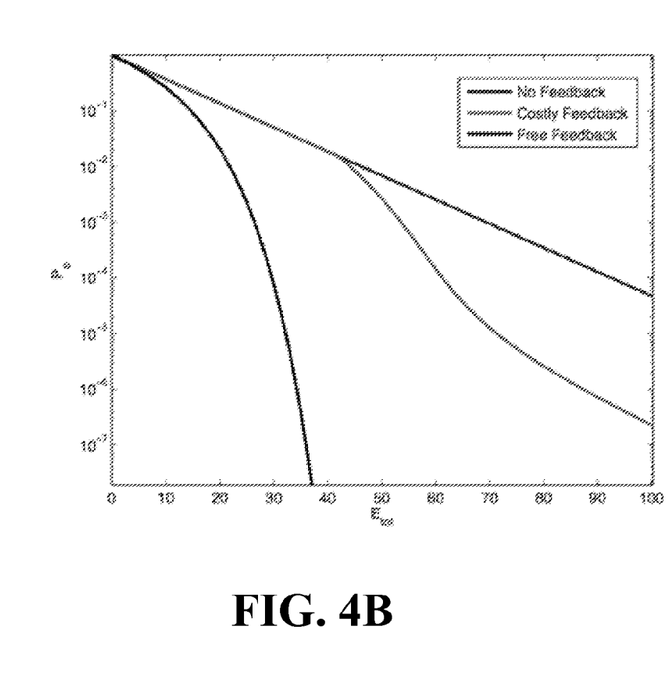
FIG. 4B depicts a plot of error probabilities, in accordance with some example embodiments.

The overall probability of error as a function of energy is depicted in FIG. 4B for T=3. FIG. 4B (as well as the other drawings) provide examples for purposes of explanation and, as such, other results may be obtained as well. It can be seen that imposing a feedback energy constraint may reduce the error exponent by a large margin. The difference between the energy constrained feedback communication and the error free feedback scenario may be unbounded when the delay constraint is removed ($T \to \infty$).

For large energy levels, there may be a gain associated with using a feedback link as compared to communication without feedback. The gain may become significant as the energy level goes up. For levels below a threshold, there may be no gain with using a lossy feedback link. That is, for low energy levels the sender may assign all the energy to one forward transmission.

As depicted in FIG. 4B, the gain of using the feedback link over using no feedback increases with the energy level above a given threshold.

In some example embodiments, a super-exponential function may represent the behavior of error probability in terms of energy consumption according to, $$\epsilon(E) = \beta e^{-\alpha E^2}. \quad (27)$$

The error function in Equation 27 may be associated with a scenario where both encoding/decoding circuit energy and transmit energy are taken into account. The function in Equation 31 is non-convex and instead of Equation 11, a more general recursive equation may characterize the overall error probability as $$P_e^{FB}(E_{tot}, T) = \min\left\{\epsilon(E_{tot}), \min_{\substack{\sigma_f, \gamma \in [0,1] \\ \sigma + \gamma \leq 1}}\left[\epsilon_1(\sigma E_{tot}, \gamma E_{tot}) + \right.\right. \quad (28)$$

$$\left.\left.\epsilon_2(\sigma E_{tot}, \gamma E_{tot}) P_e^{PB}\left(\frac{E_{tot}(1-\sigma-\gamma)}{\epsilon_2(\sigma E_{tot}, \gamma E_{tot})}, T-1\right)\right]\right\},$$

where $$\epsilon_1(x, y) = \frac{\epsilon(x)\epsilon(y)}{M-1} \quad (29)$$

$$\epsilon_2(x, y) = \epsilon(x) + \epsilon(y) - \frac{M}{M-1}\epsilon(x)\epsilon(y),$$

and $P_e^{FB}(x, 2) = \epsilon(x)$. In some example embodiments, the use of a feedback link for the super-exponential system is suboptimal if the total energy level is large enough.

The overall error performance may be further improved by allowing the receiver to process the received packets jointly. Given the possibility of combining at the receiver, the transmitter may use feedback messages to estimate what is missing at the receiver and resend the missing part only, thereby saving transmit resources. Under this scheme, one may apply transmission/combining techniques similar to the ones used in different H-ARQ schemes. The performance gain of combining over separate processing depends on the energy model, energy budget and the rate. The performance gap for a high rate system with exponential error function and total energy beyond a certain threshold is expected to be low as this scheme leads to an exponential error decay as a function of T.

In some systems, in addition to the expected energy constraint, there is another constraint on the peak transmit energy that may be imposed by the limitations on the dynamic range of transmitter's power amplifier. The framework used in this work is proposed for a general error function and may capture the peak energy limitations as well. In particular one can use an error function $\epsilon(\cdot)$ that is flat beyond a certain threshold (imposed by peak energy constraint).

The framework can be used for a general error function that can capture the fading nature of wireless channels such as M-ary coherent modulation under Rayleigh fading. While error decay may be slower than the pure AWGN model (exponential error function), the observation may be similar. That is, below a certain threshold whereby the use of feedback under the threshold is suboptimal. In some examples, the channel coherence time may be approximately equal to the duration of one transmission. When the coherence time is large enough, the transmitter can use the initial transmission(s) in each fading block as a pilot and learn the channel state, then adapt the following transmissions accordingly. Such a scenario may call for a new optimization framework that accounts for the trade-off between different components of energy consumption (e.g. pilot energy, data energy and the corresponding feedback energy).

The feedback framework can be extended to several different variants of energy consumption and cost models depending on the application and the system constraints. One potential extension is to refine the model for the error function. For example, a model that is more complex and better fits actual measurements may represent this dependence more accurately. Another possible extension is to consider different error functions on the forward and feedback links. This is justified by the fact that the decoded packet at the receiver has high correlation with the transmitted packet. Such a statistical correlation can be leveraged by the receiver to communicate its decoded packet with less energy. A similar asymmetry is observed in H-ARQ systems as well, where the receiver detects its own decoding error and sends back only a few bits of acknowledgment. Besides the consumption model, the cost of energy can also be different on forward and feedback channels. For example such a scenario can happen when the battery limitations on the sender and the receiver are different.

The effectiveness of using feedback may largely vary depending on the energy consumption model and the total available energy. Under a linearly exponential error probability in terms of consumed energy, the use of feedback can significantly increase the energy efficiency for large values of available energy. Under the same consumption model, the use of feedback is sub-optimal if energy budget is below a certain threshold. The opposite result is true for the super-exponential models for which the feedback does not impact the energy efficiency if the total energy is above a given threshold.

Figure 5:
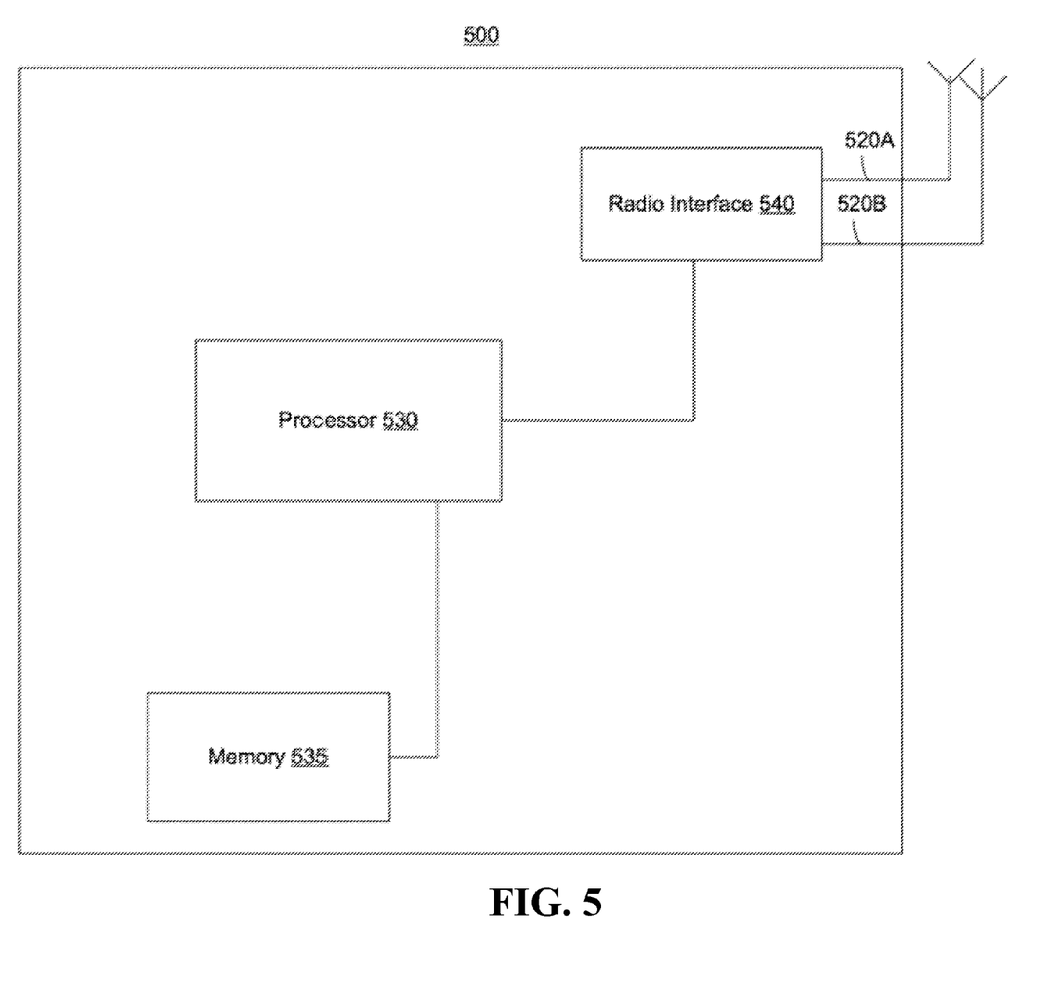
FIG. 5 depicts a block diagram of a radio, in accordance with some example embodiments.

FIG. 5 depicts a block diagram of a radio 500. The radio 500 may be used at for example data sender 105 and/or data receiver 110. Radio 500 may include one or more antennas, such as antennas 520A-B for receiving a downlink and transmitting via an uplink. The radio 500 may also include a radio interface 540 (also referred to as a transceiver) coupled to the antennas 520A-B. The radio interface 540 may include other components, such as filters, converters (for example, digital-to-analog converters and the like), symbol demappers, signal shaping components, an Inverse Fast Fourier Transform (IFFT) module, coders, decoders, the like, to process symbols carried by a downlink or an uplink. The radio 500 may further include at least one processor, such as processor 530 for controlling radio 500 and for accessing and executing program code stored in memory 535. In some example embodiments, the memory 535 includes code, which when executed by at least one processor causes one or more of the operations described herein. In some example embodiments, the radio 500 may comprise a mobile station, a mobile unit, a subscriber station, a wireless terminal, a tablet, a smart phone, a base station, a wireless access point, and/or any other type of wireless device configured to provide the energy savings disclosed herein.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   sending, by a radio, a first message to another radio, the first message carried by a forward wireless radio channel and sent at a first forward energy level;
   receiving, at the radio and in response to the first message, a second message carried by a feedback wireless radio channel from the other radio, the second message sent at a feedback energy level;
   comparing contents of the first message and the second message to determine whether at least one error is present;
   sending a termination message to the other radio, when the comparing indicates the first message and the second message have contents that match; and
   when the comparing indicates the at least one error is present,
      determining, at the radio, a second forward energy level, the second forward energy level optimized based on a total energy constraint for a system including the radio and the other radio, the total energy constraint representing a sum of the first forward energy level, the second forward energy level, and the feedback energy level, and
      resending, by the radio, the first message to the other radio, the first message retransmitted at the determined second forward energy level optimized based on the total energy constraint for the system.

2. The method of claim 1, wherein the second forward energy level is determined based on changing one or more of a modulation, an information encoding, a transmit power level, or a data rate.

3. The method of claim 1, wherein the second forward energy level has a higher energy value than the first forward energy level in order to at least satisfy a target error rate.

4. The method of claim 1, wherein the determining further comprising an optimization comprising:
   fixing the second forward energy level at a first constant energy value;
   fixing the total energy constraint at a second constant energy value; and
   adjusting the feedback energy level to reduce an error rate to at least satisfy a target error rate.

5. The method of claim 1, wherein the determining further comprising an optimization comprising:
   fixing the feedback energy level at a first constant energy value;
   fixing the total energy constraint at a second constant energy value; and
   adjusting the second forward energy level to reduce an error rate to at least satisfy a target error rate.

6. The method of claim 1, wherein the second energy level minimizes the total energy level subject to a target error rate.

7. An apparatus comprising:
   at least one processor; and
   at least one memory including computer program code, the at least one processor, the at least one memory, and the computer program code configured to cause operations comprising:
   sending, by the apparatus comprising a radio, a first message to another radio, the first message carried by a forward wireless radio channel and sent at a first forward energy level;
   receiving, at the radio and in response to the first message, a second message carried by a feedback wireless radio channel from the other radio, the second message sent at a feedback energy level;
   comparing contents of the first message and the second message to determine whether at least one error is present;
   sending a termination message to the other radio, when the comparing indicates the first message and the second message have contents that match; and
   when the comparing indicates the at least one error is present,
      determining, at the radio, a second forward energy level, the second forward energy level optimized based on a total energy constraint for a system including the radio and the other radio, the total energy constraint representing a sum of the first forward energy level, the second forward energy level, and the feedback energy level, and
      resending, by the radio, the first message to the other radio, the first message retransmitted at the determined second forward energy level optimized based on the total energy constraint for the system.

8. The apparatus of claim 7, wherein the second forward energy level is determined based on changing one or more of a modulation, an information encoding, a transmit power level, or a data rate.

9. The apparatus of claim 7, wherein the second forward energy level has a higher energy value than the first predetermined energy level in order to at least satisfy a target error rate.

10. The apparatus of claim 7, wherein the determining further comprising an optimization comprising:
    fixing the second forward energy level at a first constant energy value;
    fixing the total energy constraint at a second constant energy value; and
    adjusting the feedback energy level to reduce an error rate to at least satisfy a target error rate.

11. The apparatus of claim 7, wherein the determining further comprising an optimization comprising:
    fixing the feedback energy level at a first constant energy value;
    fixing the total energy constraint at a second constant energy value; and
    adjusting the second forward energy level to reduce an error rate to at least satisfy a target error rate.

12. A non-transitory computer-readable medium encoded with instructions that, when executed by at least one processor, cause operations comprising:

sending, by the apparatus comprising a radio, a first message to another radio, the first message carried by a forward wireless radio channel and sent at a first forward energy level;

receiving, at the radio and in response to the first message, a second message carried by a feedback wireless radio channel from the other radio, the second message sent at a feedback energy level;

comparing contents of the first message and the second message to determine whether at least one error is present;

sending a termination message to the other radio, when the comparing indicates the first message and the second message have contents that match; and when the comparing indicates the at least one error is present,     determining, at the radio, a second forward energy level, the second forward energy level optimized based on a total energy constraint for a system including the radio and the other radio, the total energy constraint representing a sum of the first forward energy level, the second forward energy level, and the feedback energy level, and     resending, by the radio, the first message to the other radio, the first message retransmitted at the determined second forward energy level optimized based on the total energy constraint for the system.

13. The non-transitory computer-readable medium of claim 12, wherein the determining further comprising an optimization comprising:

fixing the second forward energy level at a first constant energy value;

fixing the total energy constraint at a second constant energy value; and     adjusting the feedback energy level to reduce an error rate to at least satisfy a target error rate.

14. The non-transitory computer-readable medium of claim 12, wherein the determining further comprising an optimization comprising:

fixing the feedback energy level at a first constant energy value;

fixing the total energy constraint at a second constant energy value; and     adjusting the second forward energy level to reduce an error rate to at least satisfy a target error rate.

\* \* \* \* \*